United States Patent [19]
Rayner

[11] Patent Number: 6,105,890
[45] Date of Patent: Aug. 22, 2000

[54] SUPPORT BEARING FOR NUTATING MACHINES

[75] Inventor: William Richards Rayner, Neutral Bay, Australia

[73] Assignee: Hicom International Pty Limited, Australia

[21] Appl. No.: 09/242,622

[22] PCT Filed: Aug. 20, 1997

[86] PCT No.: PCT/AU97/00533

§ 371 Date: Feb. 19, 1999

§ 102(e) Date: Feb. 19, 1999

[87] PCT Pub. No.: WO98/07518

PCT Pub. Date: Feb. 26, 1998

[30] Foreign Application Priority Data

Aug. 22, 1996 [AU] Australia ................................ PO1802

[51] Int. Cl.[7] ................................................. B02C 17/24
[52] U.S. Cl. ........................................... 241/179; 384/215
[58] Field of Search ............................ 241/179; 384/620, 384/215

[56] References Cited

U.S. PATENT DOCUMENTS

| 4,657,410 | 4/1987 | Hibner | 384/215 |
| 4,733,825 | 3/1988 | Boyes et al. | 241/179 |
| 5,201,233 | 4/1993 | Skinner et al. | 384/620 |

*Primary Examiner*—Mark Rosenbaum
*Attorney, Agent, or Firm*—Larson & Taylor, PLC

[57] ABSTRACT

In a nutating machine such as a high intensity comminution machine having a nutating drum (1), a support bearing is provided by pairs of rolling bearing surfaces (6 and 8, and 7 and 9). In order to reduce power requirements and wear, each pair of complementary contact paths traced out by the bearing surface pairs has an equal ratio of (a) the path length of the stationary bearing surface (8, 9) to (b) the path length of the nutating bearing surface (6, 7). In one embodiment, irrotational movement of the nutating element is achieved by having equal path lengths as between the stationary bearing surface and the nutating bearing surface in both pairs.

20 Claims, 5 Drawing Sheets

SUPPORT BEARING FOR NUTATING MACHINES

TECHNICAL FIELD

This invention relates to bearings in machines which support and constrain the motion of machine elements which are driven with nutating motion.

BACKGROUND ART

For the purpose of this specification nutating motion of a machine element relative to a fixed frame is defined as the motion of the element, an axis of which intersects with and traces out a conical surface about a stationary axis of the fixed frame. In the general case, the nutating element has a net rotational motion about its axis, relative to the fixed frame. A special case of nutating motion is one in which the nutating element has no net rotational motion.

Nutating machines may be used in a diverse range of applications including those requiring transmission of inertial loads, transmission of high compression forces, and where their characteristic conical motion is required. Inertial load transmission applications may include drive mechanisms for vibrating screens and compactors, vibrating fluid and powder mixers, and vibrating grinding mills. Nutating machines may generate large inertial forces as a consequence of the amplitude of rotation of the axis of the nutating element about a stationary axis. The surface velocities and total kinetic energy of the nutating elements are usually relatively small compared with eccentric rotating machines generating equivalent inertial forces. High compression force transmission applications may include comminution equipment similar to high pressure rolls crushers, in which material is compressed between two converging surfaces until breakage occurs.

Nutating machines have been found to be particularly suitable for application in high intensity comminution processes. In this application a chamber is driven with nutating motion to produce a centrifugal acceleration field within the chamber, which contains loose grinding media and solid particles to be ground. The motion and forces within the grinding media cause progressive breakage of the solid particles at a rate determined by the centrifugal acceleration of the nutating chamber. It is a characteristic of high intensity comminution machines that very high surface loadings occur at the bearing surfaces which constrain the chamber to perform a nutating motion. This may result in excessive power losses and wear caused by high slip velocities at the contact surfaces unless the contact surfaces are suitably proportioned. Application of the nutating machine geometry as defined herein has enabled low power losses to be achieved, resulting in a machine having high mechanical efficiency.

Nutating bearings constructed in accordance with the prior art have yielded high values of power losses and wear at the bearing surfaces. The present invention provides a simple and efficient means to overcome these limitations.

FIG. 1 illustrates an example from the prior art of support bearings currently used in nutating machinery of the type to which the present invention may be applied. The figure shows a support bearing in a nutating machine as described in Australian Patent Application number 568949. Element 101 is driven with nutating motion about stationary axis 104 as constrained by complementary bearing surface pairs 106 and 108, and 107 and 109. In this example the contact paths in complementary bearing surface pairs 106 and 108, and 107 and 109 are not constrained to have equal ratios of path lengths. As a consequence, the bearing surfaces are subjected to significant slip at the contact surfaces, with consequent excessive wear and power losses. FIG. 1 also shows additional complementary spherical bearing surfaces 110 and 111, on element 101 and frame member 105 respectively, which are in close engagement and constrain the position of element 101 by coincidence of the spherical centres of surfaces 110 and 111. An important function of bearing surfaces 110 and 111 is to transfer reaction forces directed normal to stationary axis 104 from element 101 to member 105 in any plane containing stationary axis 104. Radii 130 on the nutating element 101 of FIG. 1 are smaller than the corresponding adjacent radii on frame member 105, and hence contact and load transfer does not occur at these surfaces.

DISCLOSURE OF INVENTION

According to the present invention, there is provided a support bearing for a nutating element having a nutating axis constrained by the bearing to have nutating motion about a stationary axis intersecting with the nutating axis at a point of nutation symmetry, said support bearing including two pairs of bearing surfaces each pair comprising a stationary bearing surface located on a stationary support member and a nutating bearing surface located on the nutating element, each stationary bearing surface making contact with the corresponding nutating bearing surface in a plane containing the stationary axis and the nutating axis, each pair of bearing surfaces tracing out complementary contact paths of circular form on the corresponding surfaces, the complementary contact paths in each of the pairs of bearing surfaces having substantially equal ratios of mean path length in the stationary bearing surface to the mean path length in the corresponding nutating bearing surface.

It has been found in practice that the ratio of path length in the stationary bearing surfaces to that in the corresponding surfaces on the nutating element, as measured on the mean lines of the contact zones, should correspond within a difference of 0.8%, and should preferably be within a difference of 0.4%. Values outside these figures are associated with high slip at the contact surfaces, with corresponding excessive wear and power consumption.

In one embodiment of the invention, means are provided to restrain net rotation of the nutating element about its nutating axis relative to the stationary frame member. In this embodiment the ratio of path lengths in each of the pairs of complementary contact paths is maintained substantially equal to unity. Irrotational motion of the nutating element is not a requirement of all envisaged applications of the nutating machine. For example, it may be advantageous in applications to inertial vibrating drive mechanisms for some rotational creep of the nutating element to occur about the stationary axis in order to minimise wear at the bearing surfaces and distribute such wear uniformly.

In another embodiment of the invention the nutating element is not restrained from rotation about its nutating axis. In this embodiment the ratio of path lengths of each of the pairs of complementary contact paths may differ from unity, provided that the ratio is maintained substantially constant, as previously defined, for all contact path pairs. The nutating element undergoes a net rotation about its nutating axis in direct proportion to the deviation from unity in the ratio of bearing contact path length ratios. If all contact path ratios are equal the nutating element rolls on the frame member at the bearing contact surfaces with absence of slip. If bearing contact path ratios are not equal slip occurs at all contact surfaces, with corresponding wear and power consumption.

In embodiments of the invention described herein complementary bearing surfaces of part spherical form, having coarse radial clearance, are provided on the stationary support member and the nutating element, symmetrical about the point of nutation symmetry to constrain the motion of the nutating element.

In one embodiment of the invention, the support bearing includes a first pair of contacting bearing surfaces having matching concave and convex profiles in a radial plane containing the stationary axis and nutating axis of the nutating element said concave and convex profiles having closely matched curvature in their contact regions, and a second pair of contacting bearing surfaces having matching profiles of substantially conical form.

In another embodiment of the invention, the support bearing includes two adjacent pairs of contacting bearing surfaces having matching concave and convex profiles in a radial plane containing the stationary axis and axis of symmetry of the nutating element, and a third pair of contacting bearing surfaces having matching profiles of substantially conical form.

In the embodiments described above the substantially conical form of the bearing surfaces may include cone apex angles of large values including the extreme case of 180 degrees, which also comprises a flat surface.

BRIEF DESCRIPTION OF DRAWINGS

Notwithstanding any other forms that may fall within its scope, one preferred form of the invention will now be described with reference to the accompanying drawings, in which:

FIG. 1 is an axial section through the stationary axis of a PRIOR ART nutating machine as previously referred to.

Like parts are illustrated by like characters throughout the specification and drawings.

MODES FOR CARRYING OUT THE INVENTION

Figure 1:
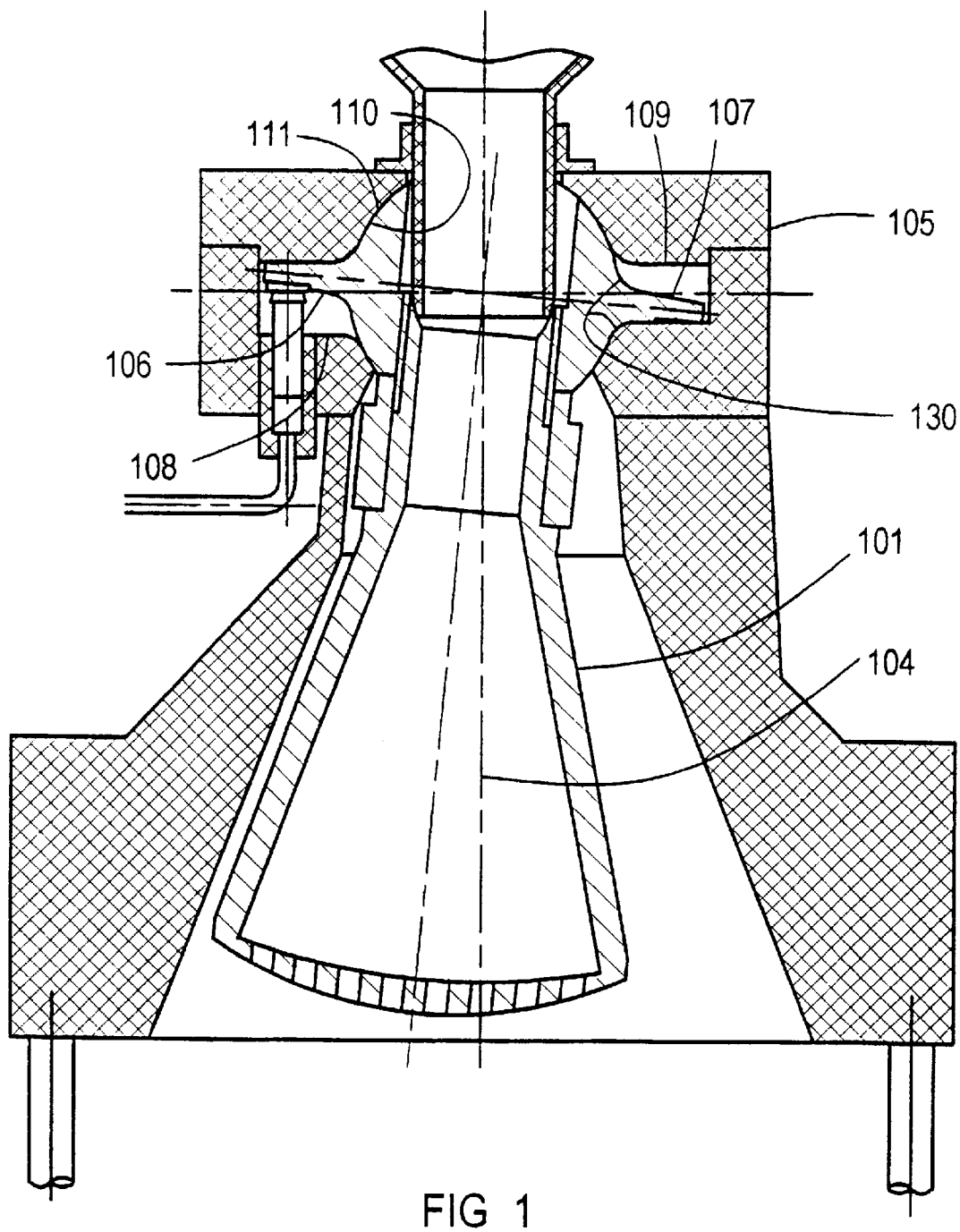
Figure 2:
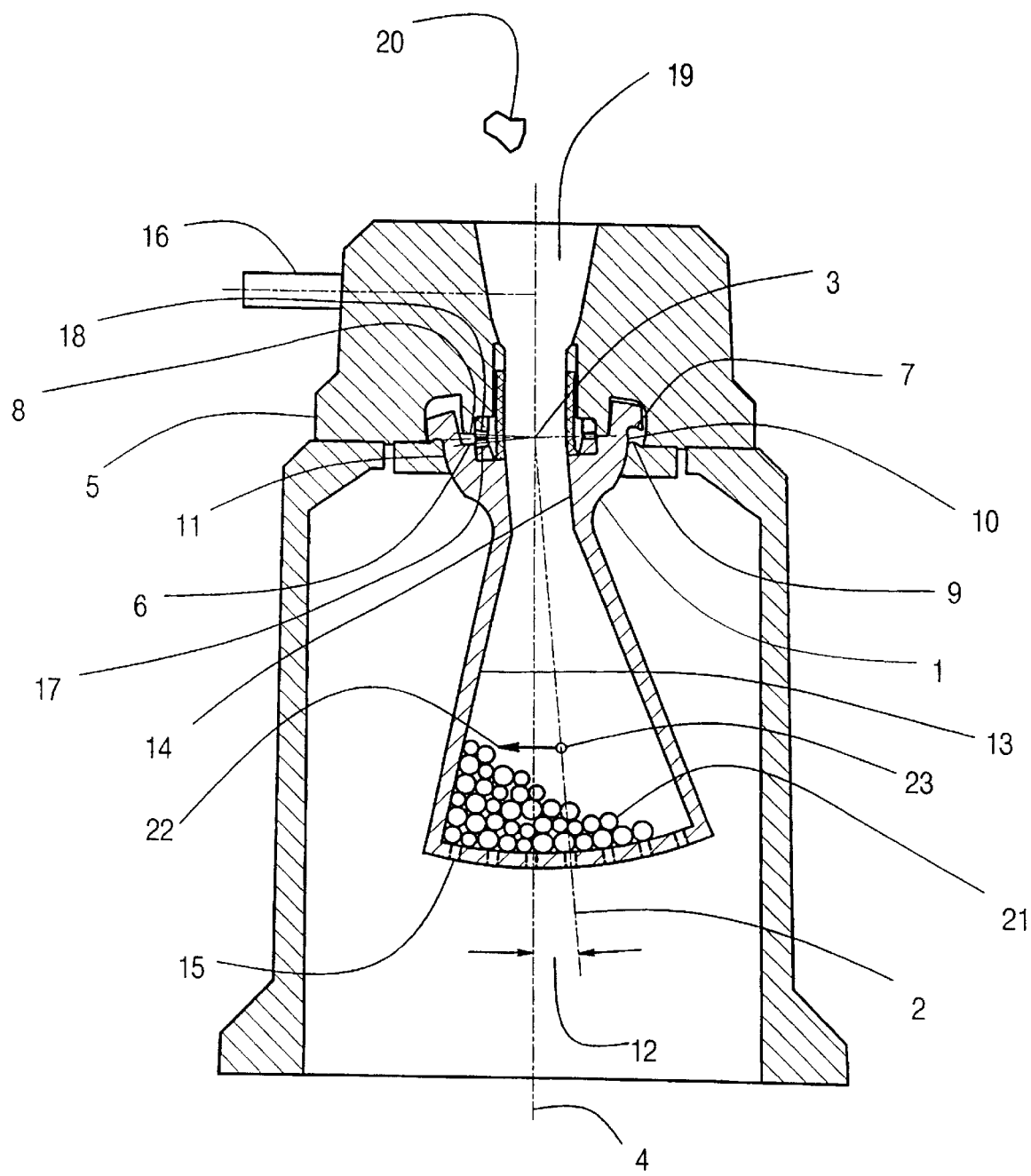
FIG. 2 shows an axial section through the stationary axis of one embodiment of the invention, comprising a high intensity comminution machine.

The embodiment illustrated in FIG. 2 represents a high intensity comminution machine, comprising: a relatively stationary axis of revolution 4 inclined with included angle 12 to a nutating axis of symmetry 2 intersecting axis 4 at a point of nutation symmetry 3; a nutating assembly 1, including a grinding chamber 13 and a feed passage 14 symmetrical about axis 2, a discharge grate 15, input drive shaft 16 adapted to drive the grinding chamber 13 in nutating motion about the relatively stationary axis of revolution 4; and support means comprising frame member or members 5 adapted to support the grinding chamber and to transmit forces and moments generated by its operation to suitable foundations. In this embodiment, rotation of nutating assembly 1 about nutating axis of symmetry 2 is prevented by a torsional restraint mechanism, comprising a nutating bevel gear 17, fixed to nutating assembly 1, which engages fixed bevel gear 18, attached to frame member 5. Nutating feed passage 14 connects to frame member 5, and thence to feed opening 19 at its upper end.

In operation of the machine shown in FIG. 2, input drive shaft 16 is driven in rotational motion, which is converted to nutating motion of grinding chamber 13 by an intermediate drive mechanism (not shown). Solid feed particles 20 are fed into feed opening 19 from where they move by gravity through feed passage 14 to grinding chamber 13. The feed particles interact with loose solid grinding media 21, and progressively break down to finer size fractions. Fine size fractions of feed particles 20 discharge from grinding chamber 13 via grate openings 15.

Figure 3:
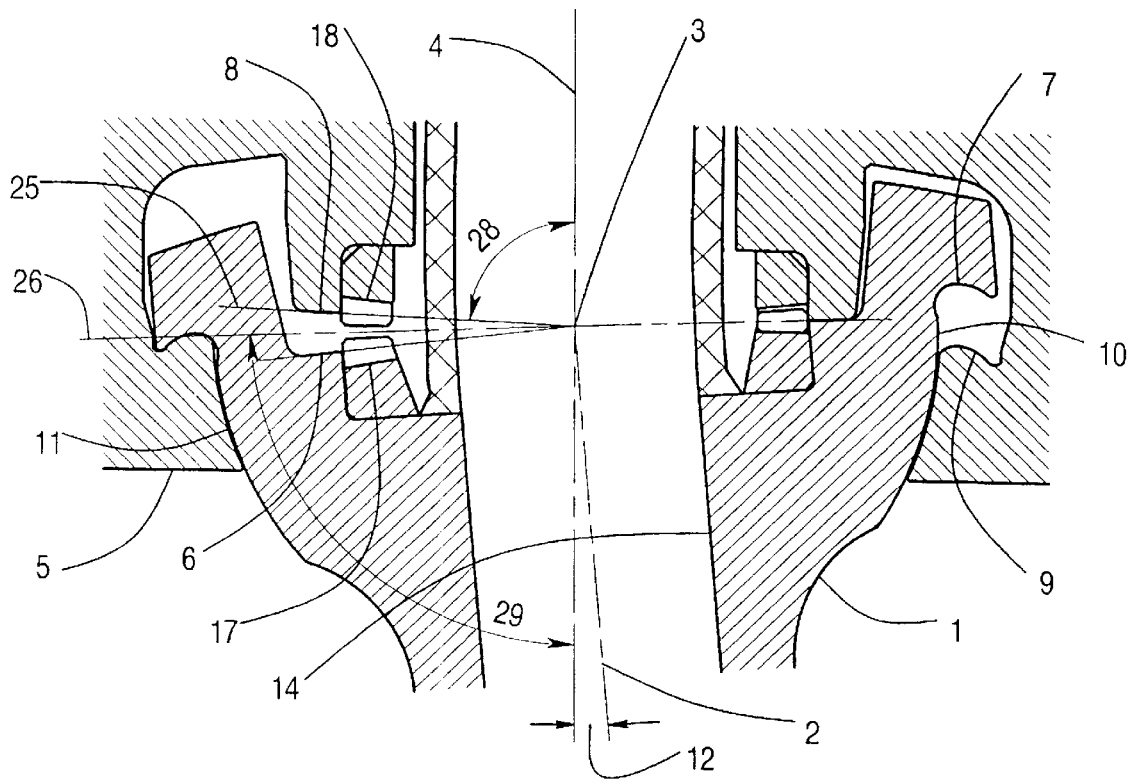
FIG. 3 shows an enlarged view of the support bearing forming part of the machine shown in FIG. 2.
Figure 4:
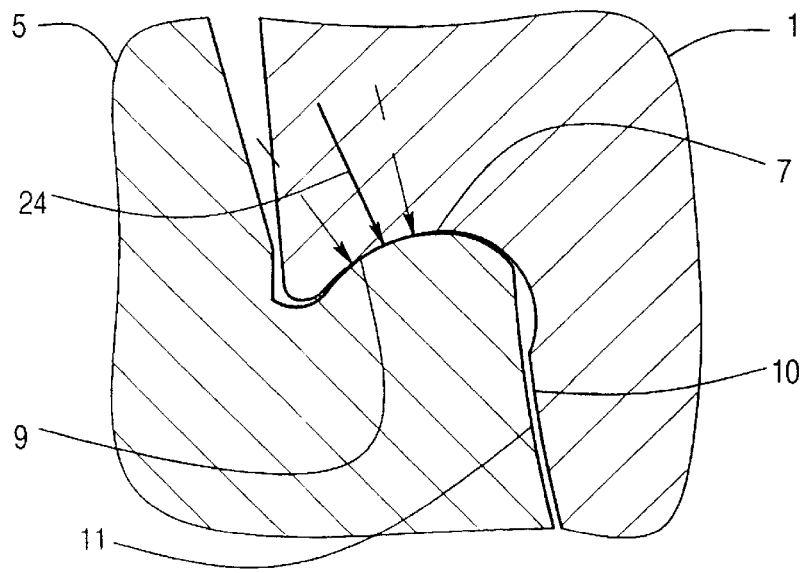
FIG. 4 shows an enlarged view of matching concave and convex bearing surfaces comprising parts of the bearing shown in FIG. 3, in which the bearing surfaces have single point contact.

The nutating assembly 1 in FIG. 2 is located and constrained to perform the desired nutating motion about the axis of revolution 4 by continuous rolling contact at surfaces 6 and 8, and 7 and 9 of a nutating bearing shown in FIGS. 3 and 4. The nutating assembly 1 is supported eccentrically, at complementary bearing surface pairs 6 and 8, and 7 and 9, from its centroid 23, with the stationary bearing surfaces 8 and 9 being disposed symmetrically about opposite extremities of the stationary axis 4 relative to the point of nutation symmetry 3.

The bearing geometry is configured to enable the corresponding complementary bearing surfaces 7 and 9 to transmit reaction forces directed normal to stationary axis 4 from element 1 to member 5 in a plane containing the axis of symmetry of the nutating element 2 and the stationary axis 4.

The use and operation of the invention will now be described with reference to the attached figures.

The nutating assembly 1 in FIG. 2 is located and constrained to perform the desired nutating motion about the axis of revolution 4 by continuous rolling contact between two pairs of contacting bearing surfaces on the nutating assembly 1 and frame member 5. Nutating motion constraint of the nutating assembly 1 is provided by the toroidal nutating bearing surface 7 rolling on opposing fixed toroidal bearing surface 9 on frame member 5, and nutating conical bearing surface 6 rolling on opposing fixed conical bearing surface 8 on frame member 5. Bearing surfaces 6 and 8 may be crowned to accommodate misalignment errors by approximating the conical bearing surfaces with large radius convex profiles.

In the embodiment shown in FIGS. 2 and 3, in which the nutating assembly 1 is restrained from rotation about its axis 2, each set of contact paths generated by complementary bearing surface pairs 7 and 9, and 6 and 8 respectively have a common path length, different from the other pair, so that the surfaces roll with absence of slip, and with corresponding low friction power losses and minimum wear. The two pairs of complementary contact paths are not constrained to be of similar size, and may differ substantially in the length of corresponding paths provided that the path lengths within each bearing surface pair are equal. In some other embodiments of the invention, rotation of the nutating assembly 1 about its axis of symmetry 2 may be permitted. In that case equality of path lengths in contact path pairs generated by the two complementary bearing surface pairs 7 and 9, and 6 and 8 is not essential. Mis-matching of the contact path lengths will result in driving of the nutating assembly 1 in rotation about its axis of symmetry 2 by frictional forces acting at the contact surfaces. Rotational creep of contact surfaces 7 and 6 past surfaces 9 and 8 respectively serves to evenly distribute frictional wear at the contact surfaces. In applications where creep at contact surfaces is permissible, slip at the contact surfaces, power consumption, and wear at bearing surfaces 6,7,8, and 9 is minimised by provision of an equal ratio of contact path length in the stationary bearing surfaces 9 and 8 to that in the corresponding nutating bearing surfaces 7 and 6 respectively, ie as defined by:

L9/L7=sin(angle 29)/sin (angle 29+angle 12) =L8/L6=sin (angle 28)/sin (angle 28+angle 12)

where L7 is the contact path length generated in bearing surface 7, etc. This requirement is satisfied when the contact zones of fixed bearing surfaces 8 and 9 lie on hypothetical right circular conical surfaces 25 and 26 respectively which have axes coincident with stationary axis 4, have vertices at the point of nutation symmetry 3, are disposed about opposite extremities of stationary axis 4 relative to the point of nutation symmetry 3, and have equal half cone angles 28 and 29 respectively. The particular case, where rotational creep of nutating assembly 1 relative to frame member 5 is not permitted, as in the embodiment of the invention depicted in FIG. 2, represents a particular case of the aforementioned relationship for contact path length ratio, where L7=L9, and L6=L8 This requirement is satisfied when the half cone angles 28 and 29 of the hypothetical right circular conical surfaces 25 and 26 have values defined as follows:

angle 28=angle 29=90°−0.5*angle 12

The dynamic effect of nutating assembly 1 nutating about stationary axis 4 may be represented as an inertial reaction force 22, resulting from centrifugal acceleration effects, acting through the centroid 23 of nutating assembly 1, and directed radially from stationary axis 4. As shown in FIG. 2, the dynamic force 22 is transferred from nutating assembly 1 to frame member 5 at complementary bearing surfaces 7 and 9, and 6 and 8. The eccentricity of force 22 from bearing surfaces 7 and 9, and 6 and 8 results in transfer of a moment couple to frame member 5 in addition to force 22, in the form of reaction forces applied at bearing surfaces 8 and 9. Complementary bearing surfaces 7 and 9 comprise profiles of concave and convex form in radial section having closely matched radii of curvature, as shown in FIG. 4. As a consequence of this geometry, the point of contact of bearing surfaces 7 and 9 may be varied over a substantial radial distance, relative to stationary axis 4, as indicated in FIG. 4, with corresponding large change in the angle of inclination of the vector 24 normal to the bearing surfaces at the contact point, by small radial displacement of nutating assembly 1 relative to the stationary axis 4. Vector 24 corresponds with the direction of the resultant reaction force transferred from nutating assembly 1 to frame member 5 at bearing surfaces 7 and 9. The range of the inclination angle available to vector 24 enables inertial force 22 to be substantially transferred to frame member 5 at convex bearing surface 9, with conical bearing surface 8 transferring principally the moment force resulting from the eccentricity of force 22. The magnitude of inertial force 22 varies progressively over the life of grinding chamber 13 as its weight reduces due to erosive wear. Accordingly the contact zone at bearing surfaces 7 and 9 adjusts continuously by small radial displacement of nutating assembly 1 to maintain coincidence between the resultant force reaction at this contact point and surface normal vector 24.

Figure 5:
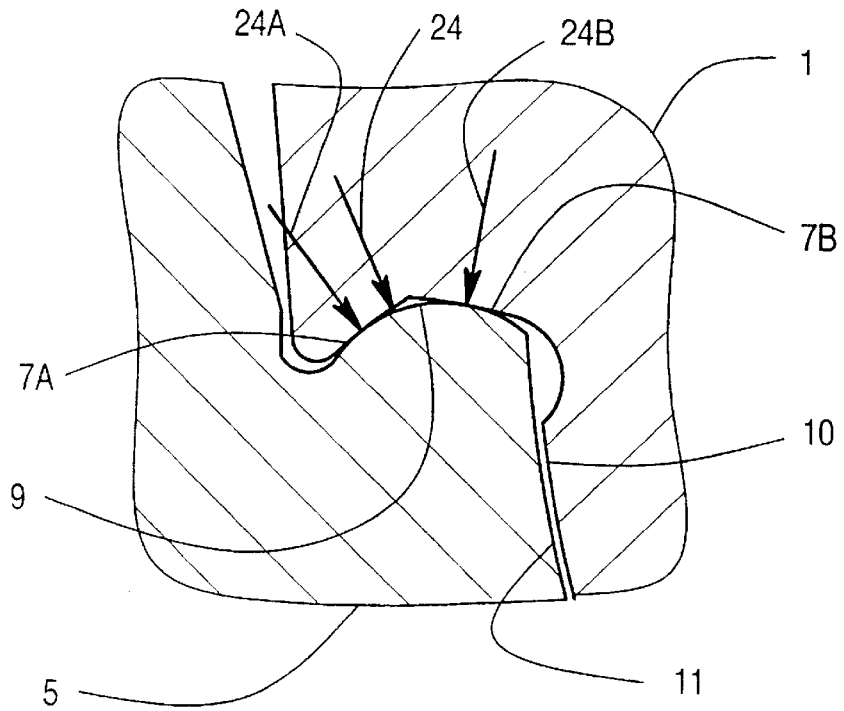
FIG. 5 shows an alternative embodiment of the matching concave and convex bearing surfaces shown in FIG. 3, in which the bearing surfaces have two point contact.

FIG. 5 shows another embodiment of the invention shown in FIG. 3, in which the matching concave and convex bearing surfaces make contact at two points in lieu of the single point contact characteristic of FIG. 3. In this embodiment the nutator is provided with two concave bearing surfaces 7A and 7B which make rolling contact with the complementary convex bearing surface 9. Forces are transmitted from the nutator 1 to the frame 5 at the points of contact of the bearing surfaces, as shown by the force vectors 24A and 24B. The combined effect of these two reaction forces is shown by the resultant force vector 24. It is apparent from FIG. 5 that the inclination of force vector 24 may vary over a wide range by variation in the force components 24A and 24B, without requiring any radial displacement of the nutating assembly 1, as described above for the bearing shown in FIG. 4.

Bearing surface 10, of substantially spherical form, on nutating assembly 1, engages with complementary surface 11 on frame member 5, providing central location of nutating assembly 1 about the point of nutation symmetry 3 in the direction normal to the plane of FIGS. 2 and 3, and transfers reaction forces from nutating assembly 1 to frame member 5 in this direction. Location of nutating assembly 1 in the plane of FIGS. 2 and 3, containing axes 2 and 4, is provided by engagement of bearing surface pairs 6 and 8, and 7 and 9. Power is transferred from nutating assembly 1 to the loose grinding media 21 in chamber 13 as the chamber moves with nutating motion about stationary axis 4. Power transfer is apparent as a force reaction between the loose grinding media 21 and the wall of chamber 13, which is directed radially to stationary axis 4, but in a plane displaced about stationary axis 1 from the plane of FIGS. 2 and 3. As a consequence of the displacement of the power reaction force from the plane of FIGS. 2 and 3, the component of force normal to this plane can not be transferred to frame member 5 at bearing surfaces 7 and 9, and complementary bearing surfaces 10 and 11 on nutating assembly 1 and frame member 5 respectively, of substantially spherical form about the point of nutation symmetry 3, are provided for this purpose. A substantial radial clearance is provided at reaction surfaces 10 and 11 to enable small magnitude radial displacement of nutating assembly 1 in the plane of FIGS. 2 and 3 without permitting contact of these surfaces.

Figure 6:
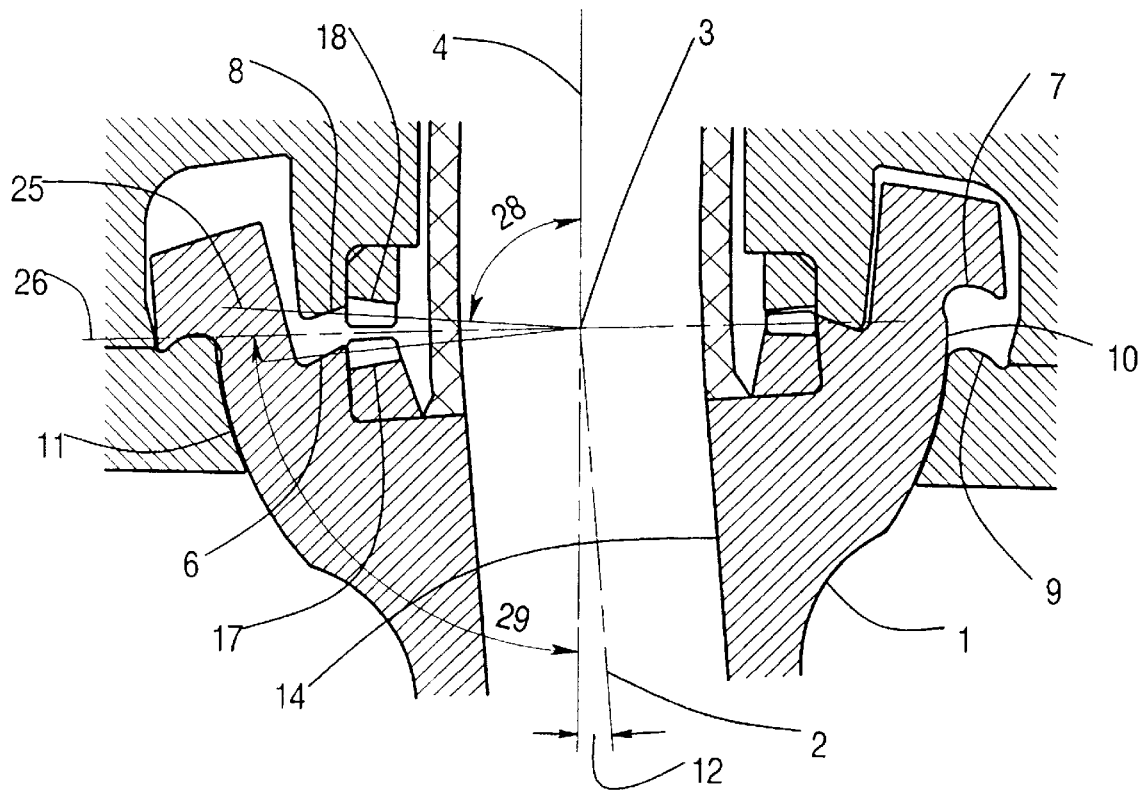
FIG. 6 shows a further embodiment of the support bearing shown in FIG. 3 showing an alternative geometry of the matching conical bearing surfaces.

In a further embodiment of the invention, as shown in FIG. 6, the geometry of one pair of complementary bearing surfaces is modified to vary the proportion of load sharing of inertial force 22 between the two sets of bearing surfaces 7 and 9, and 6 and 8. In the embodiment illustrated in FIG. 6, the apex of the substantially conical bearing surfaces 6 and 8 is displaced from the point of nutation symmetry 3. By appropriate choice of the angle of conical bearing surfaces 6 and 8, the proportion of inertial force 22 transferred from nutating assembly 1 to frame member 5 at these contact surfaces may be controlled to yield maximum load capacity for the machine. Although the inclination of bearing surfaces 6 and 8 in this embodiment results in their profiles departing from the hypothetical conical surface 25, the mean point of their contact zone remains substantially adjacent surface 25. The effect of this embodiment is to reduce the radial component of force reaction at bearing surfaces 7 and 9, for a given value of force 22, and to reduce the angle of inclination of force vector 24 to stationary axis 4. This reduces the eccentricity of loading imparted to bearing surface 7, and as a consequence the level of stress in the region of this surface resulting from bending effects is reduced accordingly.

Figure 7:
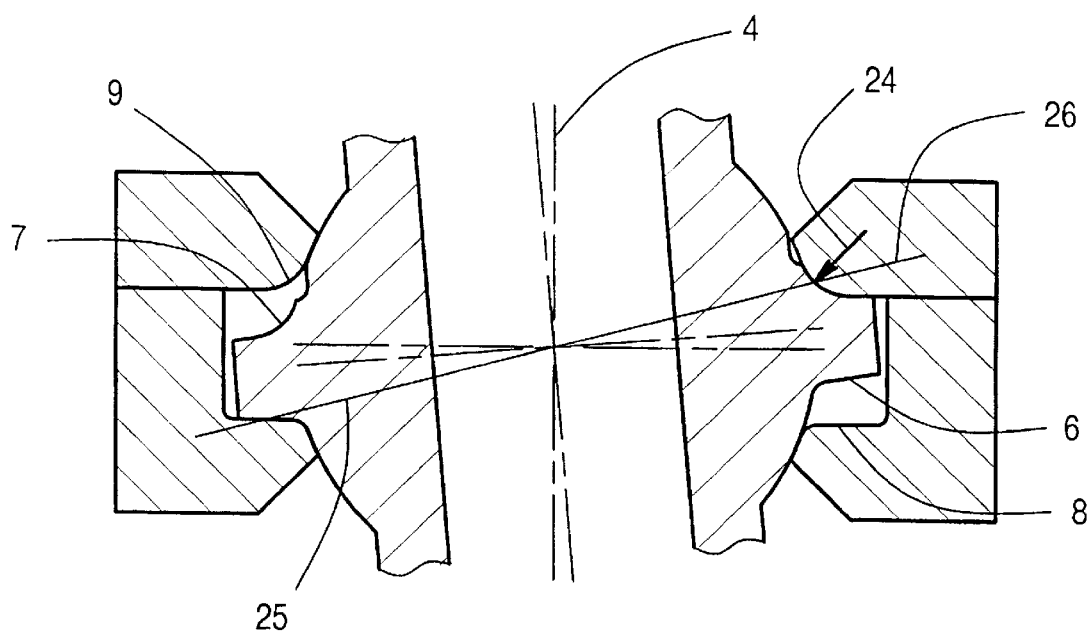
FIG. 7 shows another embodiment of the support bearing shown in FIG. 3.

FIG. 7 shows a further embodiment of the support bearing shown in FIG. 3. Nutating motion constraint of the nutating element 1 is provided by the toroidal bearing surface 7 rolling on opposing fixed toroidal bearing surface 9 on frame member 5, and nutating conical bearing surface 6 rolling on opposing fixed conical or flat bearing surface 8 on frame member 5. Bearing surfaces 7 and 9 engage with substantially line contact with the bearing surfaces having substantially equal radii of curvature in the plane of the figure. The point of application of bearing reaction force 24 may vary around the bearing surface 7 to match the angular orientation of the reaction force with the surface normal vector at the force application point. This bearing is suitable only where a net rotational motion of the nutating element 1 can be tolerated, as a consequence of the geometric constraints imposed by the locations of bearing surfaces 6 and 7 on nutating element 1. Wear and power consumption is minimised by provision of a substantially equal ratio of contact path length in the stationary bearing surfaces 8 and 9 to those in the corresponding surfaces 6 and 7 in the nutating element 1. This requirement is satisfied by providing equal angles of inclination for mean contact lines 25 and 26 relative to the stationary axis 4.

In this manner a support bearing for a nutating machine is provided which is of relatively simple, compact form, which is subject to low power losses, and which can continue to operate reliably and efficiently even when subject to progressive wear at the bearing surfaces.

What is claimed is:

1. A support bearing for a nutating element, said support bearing adapted to constrain the nutating element for movement about a nutating axis and in a nutating motion about a stationary axis intersecting with the nutating axis at a point of nutation symmetry, said support bearing comprising:

two pairs of bearing surfaces, each said pair comprising a stationary bearing surface which is adapted to be located on a stationary support member and a nutating bearing surface which is adapted to be located on the nutating element, each said stationary bearing surface making contact with the corresponding nutating bearing surface in a plane containing the stationary axis and the nutating axis, each pair of bearing surfaces tracing out complementary contact paths of circular form on the corresponding surfaces, the complementary contact paths in each of the pairs of bearing surfaces having substantially equal ratios of mean path length in the stationary bearing surface to the mean path length in the corresponding nutation bearing surface.

2. A support bearing for a nutating element as claimed in claim 1 wherein the stationary bearing surfaces are disposed symmetrically about the stationary axis on opposite sides of the point of nutation symmetry.

3. A support bearing for a nutating element as claimed in claim 1 wherein the ratio of mean path length in the stationary bearing surface to mean path length in the corresponding nutating bearing surface is substantially 1:1 for each pair of contact paths.

4. A support bearing for a nutating element as claimed in claim 3 including torsional restraint means for preventing rotation of the nutating bearing surfaces about the stationary axis.

5. A support bearing for a nutating element as claimed in claim 4 wherein said torsional restraint means comprise a first bevel gear element which is adapted to be attached to the nutating element and a corresponding second bevel gear element engaged with said first bevel gear element and which is adapted to be attached to the stationary support member, the said bevel gear elements being co-axial with the nutating axis and the stationary axis respectively.

6. A support bearing for a nutating element as claimed in claim 5 wherein respective apexes of respective conical pitch surfaces of said first and second gear elements intersect at or near the point of nutation symmetry.

7. A support bearing for a nutating element as claimed in claim 6 wherein a half cone angle of said conical pitch surfaces is equal to ninety degrees minus half an included angle between the stationary axis and the nutating axis.

8. A support bearing for a nutating element as claimed in claim 1 wherein one pair of bearing surfaces have matching concave and convex profiles, and wherein the other pair of bearing surfaces have matching profiles of substantially conical form.

9. A support bearing for a nutating element as claimed in claim 1 wherein one pair of bearing surfaces comprises two adjacent concave surfaces tracing out contact paths against a convex surface, there being two points of contact between the two adjacent concave surfaces and the convex surface; and wherein the other pair of bearing surfaces have matching profiles of substantially conical form.

10. A support bearing for a nutating element as claimed in claim 9 wherein the two adjacent concave surfaces are on the nutating bearing surface and the convex surface is on the stationary bearing surface.

11. A support bearing for a nutating element as claimed in claim 8 wherein an apex of the pair of bearing surfaces of substantially conical form is located at or near the point of nutation symmetry.

12. A support bearing for a nutating element as claimed in claim 1 wherein said stationary bearing surface includes a stationary reaction surface of concave spherical form symmetrical about the point of nutation symmetry, and wherein said nutating bearing surface includes a corresponding surface of convex spherical form which reacts with said stationary reaction surface.

13. A support bearing for a nutating element as claimed in claim 1 in which the complementary contact paths on the bearing surfaces lie on or adjacent two hypothetical conical surfaces which have apexes at or adjacent the point of nutation symmetry and which have equal half cone angles measured from the stationary axis.

14. A support bearing for a nutating element as claimed in claim 13 wherein the half cone angles measured from the stationary axis have a magnitude of ninety degrees minus one half an included angle between the stationary axis and the nutating axis.

15. A nutating comminution machine comprising:

a nutating element;

a stationary support element; and a support bearing for said nutating element, said support bearing constraining said nutating element for movement about a nutating axis and in a nutating motion about a stationary axis intersecting with the nutating axis at a point of nutation symmetry, said support bearing including two pairs of bearing surfaces, wherein each said pair comprises (a) a stationary bearing surface located on a stationary support member and (b) a nutating bearing surface located on the nutating element, wherein each said stationary bearing surface makes contact with the corresponding nutating bearing surface in a plane containing the stationary axis and the nutating axis, and wherein each pair of bearing surfaces traces out complementary contact paths of circular form on the corresponding surfaces, the complementary contact paths in each of the pairs of bearing surfaces having substantially equal ratios of mean path length in the stationary bearing surface to the mean path length in the corresponding nutation bearing surface.

16. A nutating comminution machine as claimed in claim 15 wherein the stationary bearing surfaces are disposed symmetrically about the stationary axis on opposite sides of the point of nutation symmetry.

17. A nutating comminution machine as claimed in claim 15 wherein the ratio of mean path length in the stationary bearing surface to mean path length in the corresponding nutating bearing surface is substantially 1:1 for each pair of contact paths.

18. A nutating comminution machine as claimed in claim 15 wherein said support bearing includes a torsional restraint means for preventing rotation of the nutating bearing surfaces about the stationary axis, said torsional restraint means comprising a first bevel gear element which is attached to the nutating element and a corresponding second bevel gear element engaged with said first bevel gear element and which is attached to the stationary support member, the said bevel gear elements being co-axial with the nutating axis and the stationary axis respectively.

19. A nutating comminution machine as claimed in claim 15 wherein one pair of bearing surfaces have matching concave and convex profiles, and wherein the other pair of bearing surfaces have matching profiles of substantially conical form.

20. A nutating comminution machine as claimed in claim 15 wherein one pair of bearing surfaces comprises two adjacent concave surfaces on one of the stationary support member and the nutating element tracing out contact paths against a convex surface on the other of the stationary support member and the nutating element, there being two points of contact between the two adjacent concave surfaces and the convex surface; and wherein the other pair of bearing surfaces have matching profiles of substantially conical form.

* * * * *